D. F. LINGLE.
SOIL PULVERIZER.
APPLICATION FILED JUNE 8, 1912.
1,064,352.
Patented June 10, 1913.
4 SHEETS—SHEET 4.
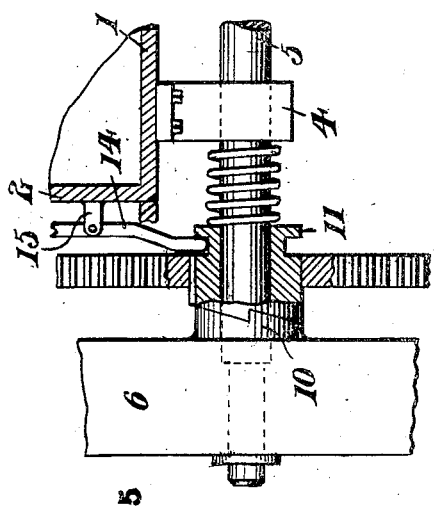
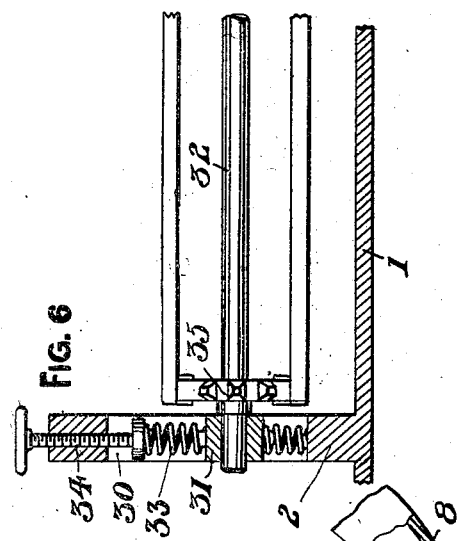
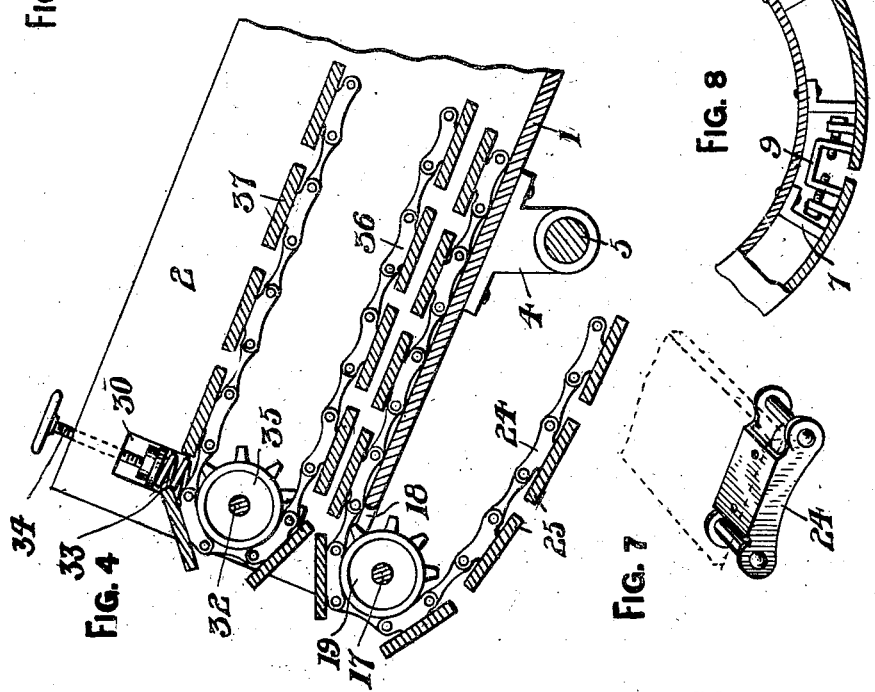
WITNESSES
INVENTOR
Daniel F. Lingle
BY
ATTORNEYS

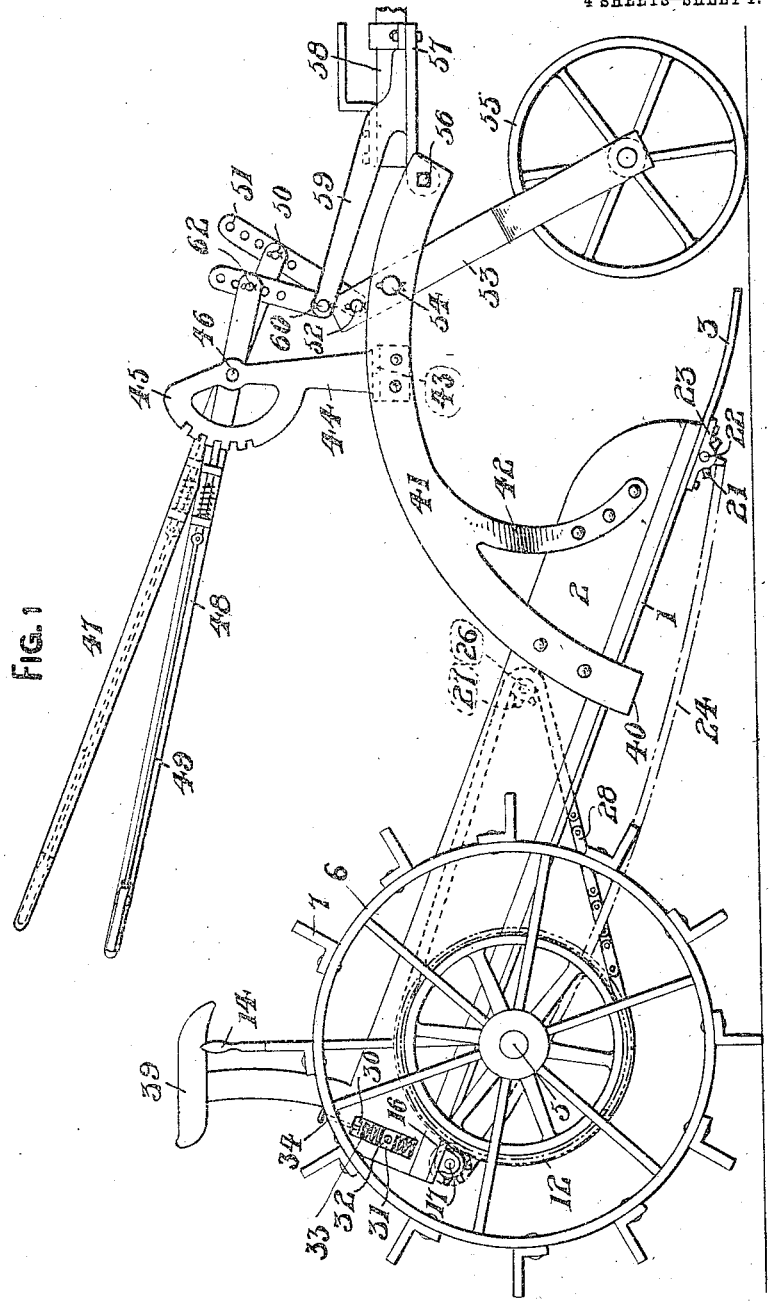

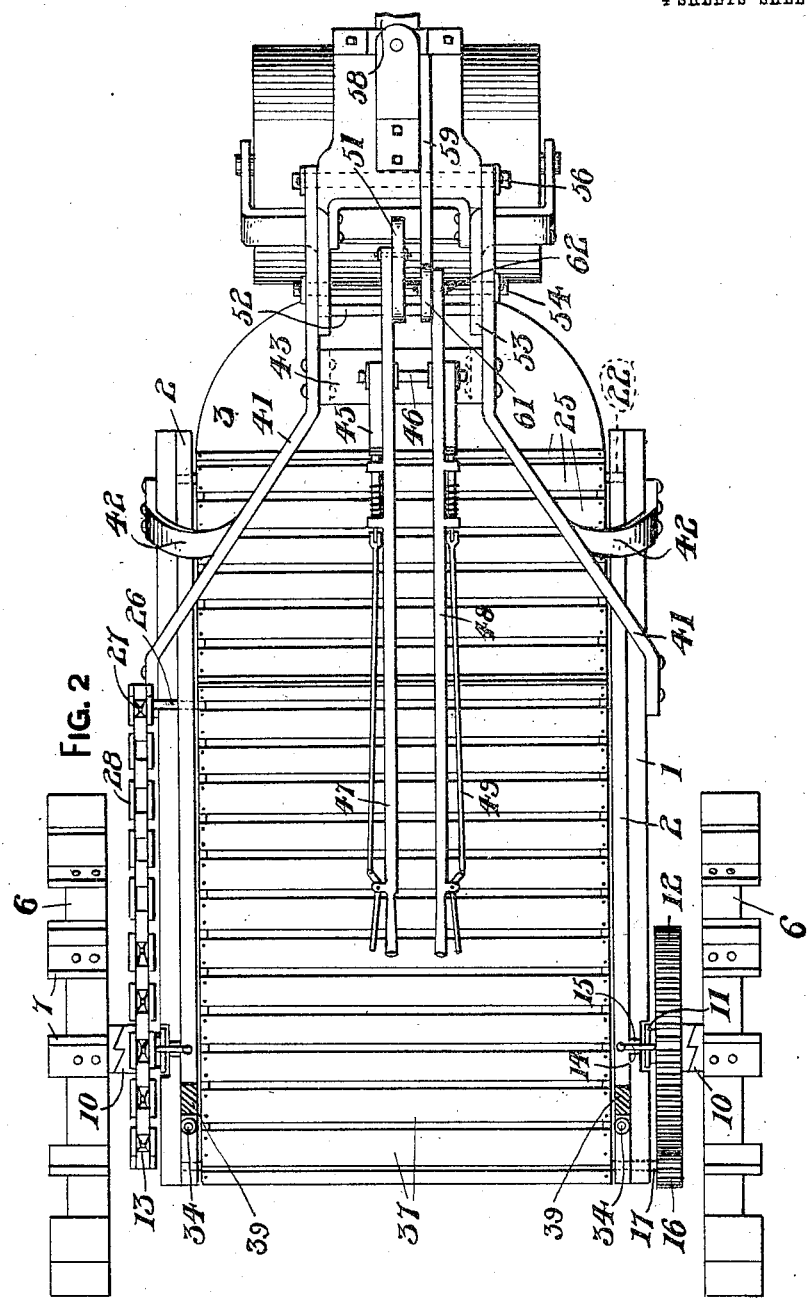

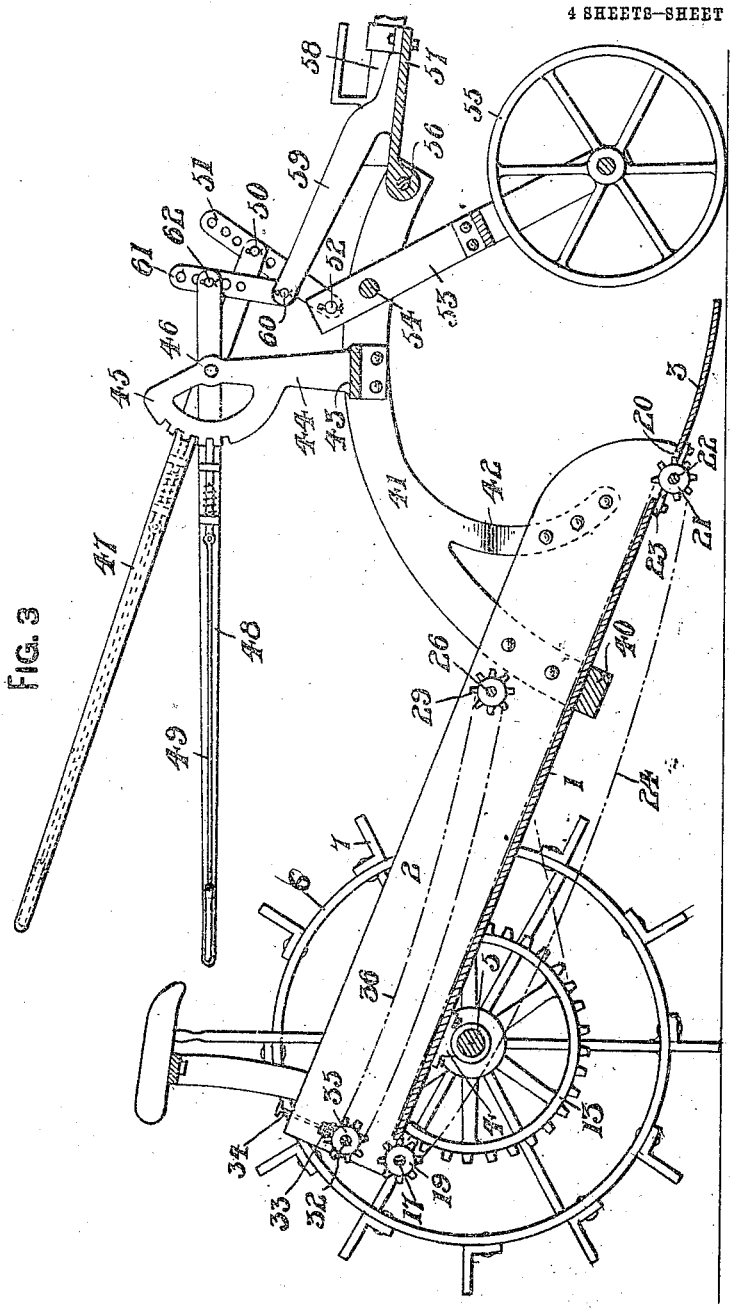

UNITED STATES PATENT OFFICE.

DANIEL F. LINGLE, OF CONNEAUTVILLE, PENNSYLVANIA.

SOIL-PULVERIZER.

1,064,352.

Specification of Letters Patent.

Patented June 10, 1913.

Application filed June 8, 1912. Serial No. 702,498.

*To all whom it may concern:*

Be it known that I, DANIEL F. LINGLE, a citizen of the United States of America, residing at Conneautville, in the county of Crawford and State of Pennsylvania, have invented certain new and useful Improvements in Soil-Pulverizers, of which the following is a specification, reference being had therein to the accompanying drawing.
This invention relates to a soil pulverizer, and the primary object of my invention is to provide an agricultural implement for expeditiously and economically pulverizing and disintegrating the soil preparatory to being sown.

Another object of this invention is to provide an agricultural implement embodying endless conveyers between which clogs of earth can be crushed and disintegrated.
A further object of this invention is to provide an agricultural implement of the above type that has novel adjustments, whereby the implement can be set for operation in connection with various kinds of soil.

A still further object of my invention is to provide an implement of the above type that is durable, easy to operate, inexpensive to manufacture, and highly efficient for tilling the soil.

With the above and other objects in view, the invention resides in a novel construction, combination and arrangement of parts to be hereinafter specifically described and then claimed.

Reference will now be had to the drawings, wherein like numerals denote corresponding parts throughout the several views, in which:—
Figure 1 is a side elevation of the soil pulverizing implement. Fig. 2 is a plan of the same with the seat thereof removed. Fig. 3 is a longitudinal sectional view of the implement. Fig. 4 is an enlarged longitudinal sectional view of the implement illustrating the crushing conveyers. Fig. 5 is an enlarged sectional view of a clutch. Fig. 6 is an enlarged detailed sectional view of an adjustable bearing. Fig. 7 is a perspective view of a detached link adapted to form part of the crushing conveyers, and Fig. 8 is a detailed sectional view of a portion of one of the wheels of the implement, illustrating a detachable tread.
An implement in accordance with this invention comprises an inclined bottom plate 1 that is provided with longitudinal parallel side walls 2. The forward end of the bottom plate 1 terminates in a curved scoop 3 adapted to scoop earth or soil onto the bottom plate as the implement moves over the ground. The bottom plate 1, adjacent to the rear end thereof, is provided with depending bearings 4 and journaled in said bearings is a rear axle 5 having the ends thereof provided with wheels 6. The rims of the wheels 6 are provided with equally spaced and radially disposed angle tread pieces 7 that engage in the soil and prevent the wheels from slipping during the operation of the implement. The tread pieces 7 also tend to disintegrate the soil in which they engage and in order that the implement can be moved off of a field or along a road, I resort to the use of channel shaped treads 8 that are mounted upon the tread pieces 7, as best shown in Fig. 8, said channel treads having the ends thereof connected by a turn buckle 9 of a conventional form. A detachable tread can be made in sections and easily mounted upon the tread pieces 7 and by using said tread, jarring and bumping is eliminated before and after the use of the implement.

The inner sides of the hubs of the wheels 6 are provided with clutch members 10 and slidably mounted upon the axle 5 are clutch members 11 adapted to engage the members 10. Mounted upon one of the clutches 11 is a large gear wheel 12 at one side of the implement and at the opposite side of the implement there is a large sprocket wheel 13. Engaging the clutch members 11 are operating levers 14 pivotally supported by brackets 15, carried by the side walls 2 of the bottom plate 1. By operating the levers 14, the clutch members 11 can be shifted into and out of engagement with the clutch members 10, therefore it is possible to control the operation of the large gear wheel 12 and the large sprocket wheel 13. The large gear wheel 12 meshes with a small gear wheel 16 that is mounted upon the end of a shaft 17 revolubly supported at the rear end of the bottom plate 1. The rear end of the bottom plate 1 is cut away, as at 18 to provide clearance for sprocket wheels 19 that are mounted upon the shaft 17.

The bottom plate 1, adjacent to the scoop 3, is provided with openings 20 and extending into said openings are sprocket wheels 21 that are mounted upon a shaft 22, journaled in bearings 23, carried by the underneath side of the bottom plate 1. Passing over the sprocket wheels 21 and 19 are endless sprocket chains 24, said chains passing over the bottom plate 1, at the inner sides of the walls 2, and each chain consisting of links to which are connected transverse equally spaced slats 25, as best shown in Fig. 4. The sprocket chains 24 and the slats 25 coöperate in providing an endless conveyer.

The side walls 2 of the implement, at a point intermediate the ends thereof, are provided with a transverse revoluble shaft 26 and mounted upon one end of the shaft is a small sprocket wheel 27. Passing over this small sprocket wheel and the large sprocket wheel 13 is an endless sprocket chain 28. The shaft 26 is provided with small sprocket wheels 29, at the inner sides of the walls 2. The side walls 2 have the rear ends thereof provided with openings 30 and arranged in said openings are movable bearings 31 for a transverse revoluble shaft 32. The bearings 31 are supported within the openings 30 by coiled springs 33 and the tension upon these springs can be increased or decreased by set screws 34 arranged in the walls 2. The shaft 32, at the inner sides of the walls 2 is provided with sprocket wheels 35 and passing over said wheels and the sprocket wheels 29 are endless sprocket chains 36, similar to the chains 24. The sprocket chains 36 support transverse equally spaced slats 37, and by reference to Figs. 3 and 4, it will be observed that the slats 37 are practically in parallelism with the slats 25 of the main conveyer. The slatted conveyer 37 coöperates with the main conveyer in crushing soil that passes between said conveyers and is discharged at the rear end of the bottom plate 1. The construction of these two crushing elements is such that the uppermost crushing element can yield when a stone or some indurate piece of material is encountered. The uppermost conveyer is therefore prevented from being injured and it is through the medium of the set screws 34 that the space between the rear ends of the conveyers can be increased or decreased, according to the nature of the soil to be tilled or crushed by the implement.

At the rear of the machine is arranged a seat, the latter being referred to generally by the reference character 39. The side 39 is secured to the machine in any suitable manner and is arranged in proximity to the operating levers that control the operation of the conveyers 24 and 36.

The bottom plate 1, intermediate the ends thereof, is provided with a transverse bar 40 and connected to the ends of said bar are side-converging curved frames 41 that have curved branches 42 connected to the side walls 2 of the bottom plate 1. The frames 41 have the upper ends thereof arranged in parallelism, as best shown in Fig. 2, and the upper ends of said frames are connected by a transverse support 43.

Mounted upon the support 43 are uprights 44 having the upper ends thereof provided with racks 45. The uprights 44 are connected by a transverse pin 46 and fulcrumed upon said pin are operating levers 47 and 48. Each operating lever extends in proximity to the operator's seat 39 and each operating lever has a conventional form of locking mechanism 49 which engages the racks 45 for locking the operating levers 47 and 48 in an adjusted position.

The forward end of the operating lever 47 is pivotally and adjustably connected, as at 50 to a link 51 that is pivotally connected, as at 52 to the upper end of a yoke 53 that is fulcrumed upon a transverse pin 54, carried by the upper ends of the frames 41. The yoke 53 supports a revoluble roller or pony wheel 55 that moves over the soil in advance of the scoop 3. By adjusting the operating lever 47, the forward ends of the frames 41 can be raised or lowered relatively to the soil, whereby the scoop 3 will properly engage the soil and at a depth that causes the soil to move onto the scoop 3 and the main conveyer of the implement.

Pivotally mounted between the forward ends of the frames 41 by a transverse pin 56 is a tongue support 57 to which can be connected a tongue 58 and a double-tree. The tongue support 57 is provided with a rearwardly projecting arm 59 and this arm is pivotally connected, as at 60 to a link 61, said link being adjustably and pivotally connected, as at 62 to the forward end of the operating lever 48. It is through the medium of the operating lever 48 and its adjusting mechanism that the forward end of the tongue 58 can be properly positioned whereby the implement will be correctly positioned and drawn.

From the foregoing it will be observed that I have devised a novel implement wherein conveyers are employed for crushing and disintegrating the soil, the uppermost conveyer being yieldably supported whereby neither of said conveyers will be injured when large stones and other indurate matter is encountered.

While in the drawings there is illustrated a preferred embodiment of my invention, it is to be understood that the structural elements are susceptible to such variations and modifications as fall within the scope of the appended claims.

What I claim is:—

1. An implement for the purpose set forth comprising an inclined bottom plate having its forward end provided with a scoop, a main conveyer including a carrier in the form of a pair of spaced cog chains movable lengthwise and traveling upon the upper face of said bottom plate and further traveling below the bottom plate, flat strips connecting the opposing links of the chain together, sprocket wheels for driving said carrier, a yieldable crushing conveyer including a carrier in the form of a pair of spaced cog chains, flat crushing strips connecting the opposing links of the chains of the yieldable conveyer together and capable of being positioned in close proximity to the strips of the other conveyer, wheels supporting the rear end of said bottom plate, means actuated by one of said supporting wheels for imparting movement to said sprocket wheels, and means actuated by the other of said supporting wheels for imparting the movement of said crushing conveyer.

2. An implement for the purpose set forth comprising an inclined bottom plate having its forward end provided with a scoop, a main conveyer including a carrier in the form of a pair of spaced cog chains movable lengthwise and traveling upon the upper face of said bottom plate and further traveling below the bottom plate, flat strips connecting the opposing links of the chain together, sprocket wheels for driving said carrier, a yieldable crushing conveyer including a carrier in the form of a pair of spaced cog chains, flat crushing strips connecting the opposing links of the chains of the yieldable conveyer together and capable of being positioned in close proximity to the strips of the other conveyer, wheels supporting the rear end of said bottom plate, means actuated by one of said supporting wheels for imparting movement to said sprocket wheels, and means actuated by the other of said supporting wheels for imparting the movement of said crushing conveyer, side walls connected to the bottom plate and adjustable yieldable supporting means for said yieldable conveyer, said yieldable supporting means carried by said side walls.

3. An implement for the purpose set forth comprising an inclined bottom plate having a scoop at its forward end, means for supporting the plate at its forward end, a pair of wheels for supporting the plate at the rear end thereof, a main conveyer movable lengthwise and traveling upon the upper face of said bottom plate and including transversely extending flat strips, side walls attached to said plate, a crushing conveyer supported by said side walls and including transversely extending strips movable during the traveling of said conveyer in close proximity to the crushing strips of said main conveyer, detachable means mounted in said side walls for yieldingly supporting said crushing conveyer, means actuated from one of said wheels for operating said main conveyer, and means actuated from the other of said wheels for imparting movement to the crushing conveyer.

4. An implement for the purpose set forth comprising an inclined bottom plate having a scoop at its forward end, means for supporting the plate at its forward end, a pair of wheels for supporting the plate at the rear end thereof, a main conveyer movable lengthwise and traveling upon the upper face of said bottom plate and including transversely extending flat strips, side walls attached to said plate, a crushing conveyer supported by said side walls and including transversely extending strips movable during the traveling of said conveyer in close proximity to the crushing strips of said main conveyer, detachable means mounted in said side walls for yieldingly supporting said crushing conveyer, means actuated from one of said wheels for operating said main conveyer, means actuated from the other of said wheels for imparting movement to the crushing conveyer, and means for controlling the operation of said conveyer.

In testimony whereof I affix my signature in the presence of two witnesses.

DANIEL F. LINGLE.

Witnesses:
G. DIXON BARTON,
RAY SMALENBERGER.